US009247108B2

(12) United States Patent
Hall et al.

(10) Patent No.: US 9,247,108 B2
(45) Date of Patent: Jan. 26, 2016

(54) USE OF ACTIVE SHUTTER DEVICE TO SECURELY DISPLAY CONTENT

(71) Applicant: Echostar UK Holdings Limited, Keighley (GB)

(72) Inventors: Neale Hall, Keighley (GB); Martyn Ross Ward, West Yorkshire (GB)

(73) Assignee: Echostar UK Holdings Limited, Keighley (GB)

( * ) Notice: Subject to any disclaimer, the term of this patent is extended or adjusted under 35 U.S.C. 154(b) by 0 days.

(21) Appl. No.: 14/030,607

(22) Filed: Sep. 18, 2013

(65) Prior Publication Data

US 2014/0226067 A1    Aug. 14, 2014

(30) Foreign Application Priority Data

Feb. 11, 2013 (EP) .................................... 13154787

(51) Int. Cl.
| | | |
|---|---|---|
| *H04N 9/47* | (2006.01) | |
| *H04N 5/04* | (2006.01) | |
| *H04N 13/04* | (2006.01) | |
| *G09G 3/00* | (2006.01) | |

(52) U.S. Cl.
CPC .. *H04N 5/04* (2013.01); *G09G 3/00* (2013.01); *H04N 13/0438* (2013.01); *H04N 13/0497* (2013.01); *H04N 2213/008* (2013.01)

(58) Field of Classification Search
CPC .......... H04N 13/0438; H04N 13/0497; H04N 2213/008
USPC .......... 348/598, 500, 473, 461, 56, 53, 358.1; 380/206, 210; 713/189, 168
See application file for complete search history.

(56) References Cited

U.S. PATENT DOCUMENTS

| | | |
|---|---|---|
| 6,959,389 B1 | 10/2005 | Dunn et al. |
| 2001/0043266 A1 | 11/2001 | Robinson et al. |
| 2006/0221067 A1 | 10/2006 | Kim et al. |
| 2007/0153122 A1 | 7/2007 | Ayite et al. |
| 2008/0118062 A1 | 5/2008 | Radivojevic et al. |
| 2010/0079676 A1 | 4/2010 | Kritt et al. |
| 2010/0177172 A1 | 7/2010 | Ko et al. |

(Continued)

OTHER PUBLICATIONS

European Patent Office, Extended European Search Report, dated Jun. 19, 2013 for European Patent Appln. No. 13154787.

(Continued)

*Primary Examiner* — Jefferey Harold
*Assistant Examiner* — Jean W Desir
(74) *Attorney, Agent, or Firm* — Ingrassia Fisher & Lorenz, P.C.

(57) ABSTRACT

An active shutter device for use in securely displaying content from a display to a user. The secure content is encoded as a sequence of video frames interspersed within a set of video frames, at least some of the other frames within the set including obfuscating data. The device comprises a receiver for receiving a synchronization signal, at least one shutter mechanism, and a processor. The processor, in response to the synchronization signal, controls the shutter mechanism so as to synchronize the shutter mechanism with, for example, the refresh rate or the video frame display rate of the display. The processor is configured to receive a frame sequence corresponding to the sequence of video frames used of the secure content, and control the shutter mechanism, in response to the received frame sequence, to allow only the video frames in the secure sequence to pass through the shutter.

20 Claims, 7 Drawing Sheets

(56) References Cited

U.S. PATENT DOCUMENTS

| | | |
|---|---|---|
| 2010/0177174 A1 | 7/2010 | Ko et al. |
| 2011/0285829 A1 | 11/2011 | Mori et al. |
| 2013/0103943 A1* | 4/2013 | Hirsch et al. ............ 713/168 |
| 2014/0179227 A1* | 6/2014 | Nousiainen ............ 455/41.2 |

OTHER PUBLICATIONS

EP Examination Report issued in EP application 13154787.9 dated Aug. 4, 2015.

* cited by examiner

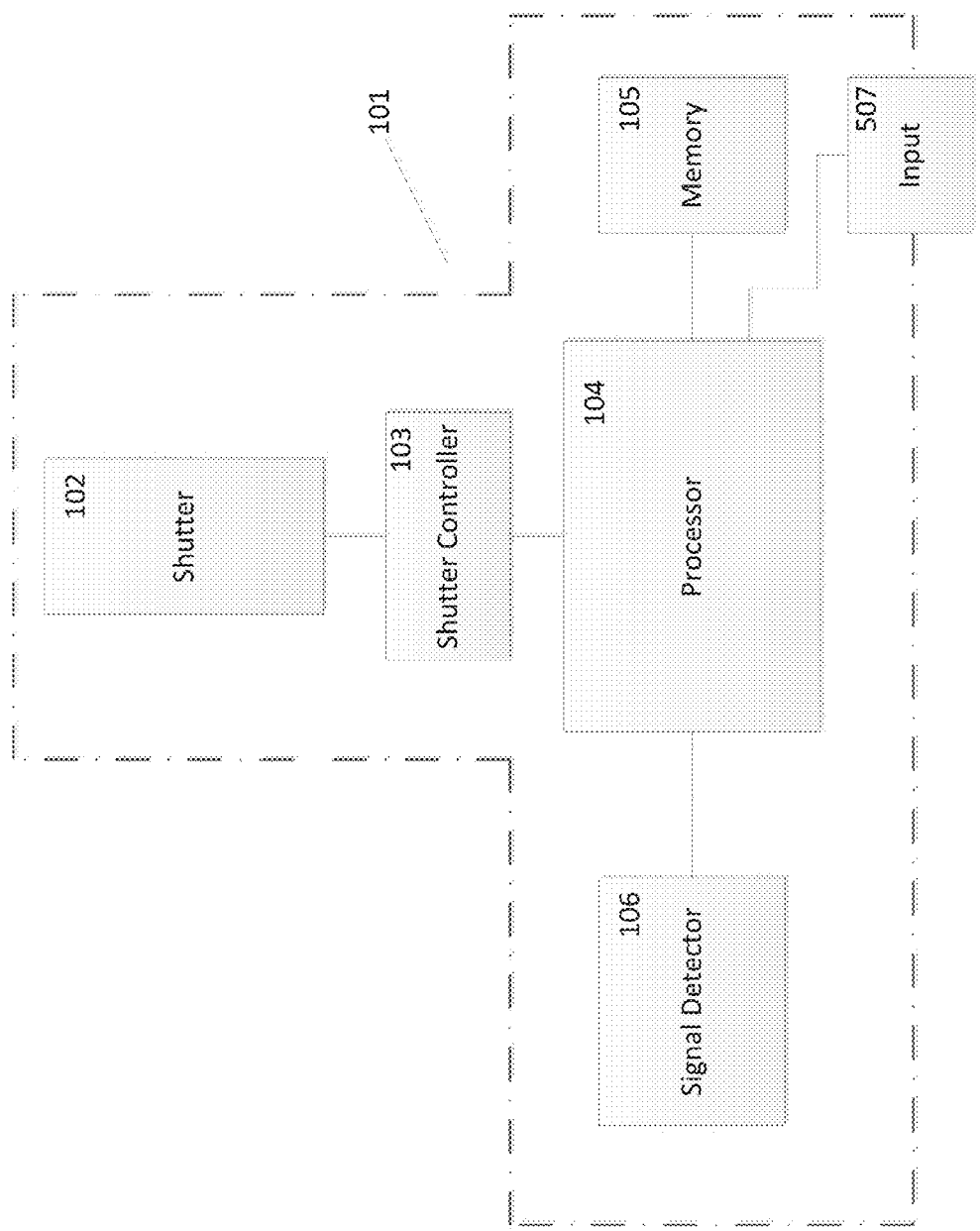

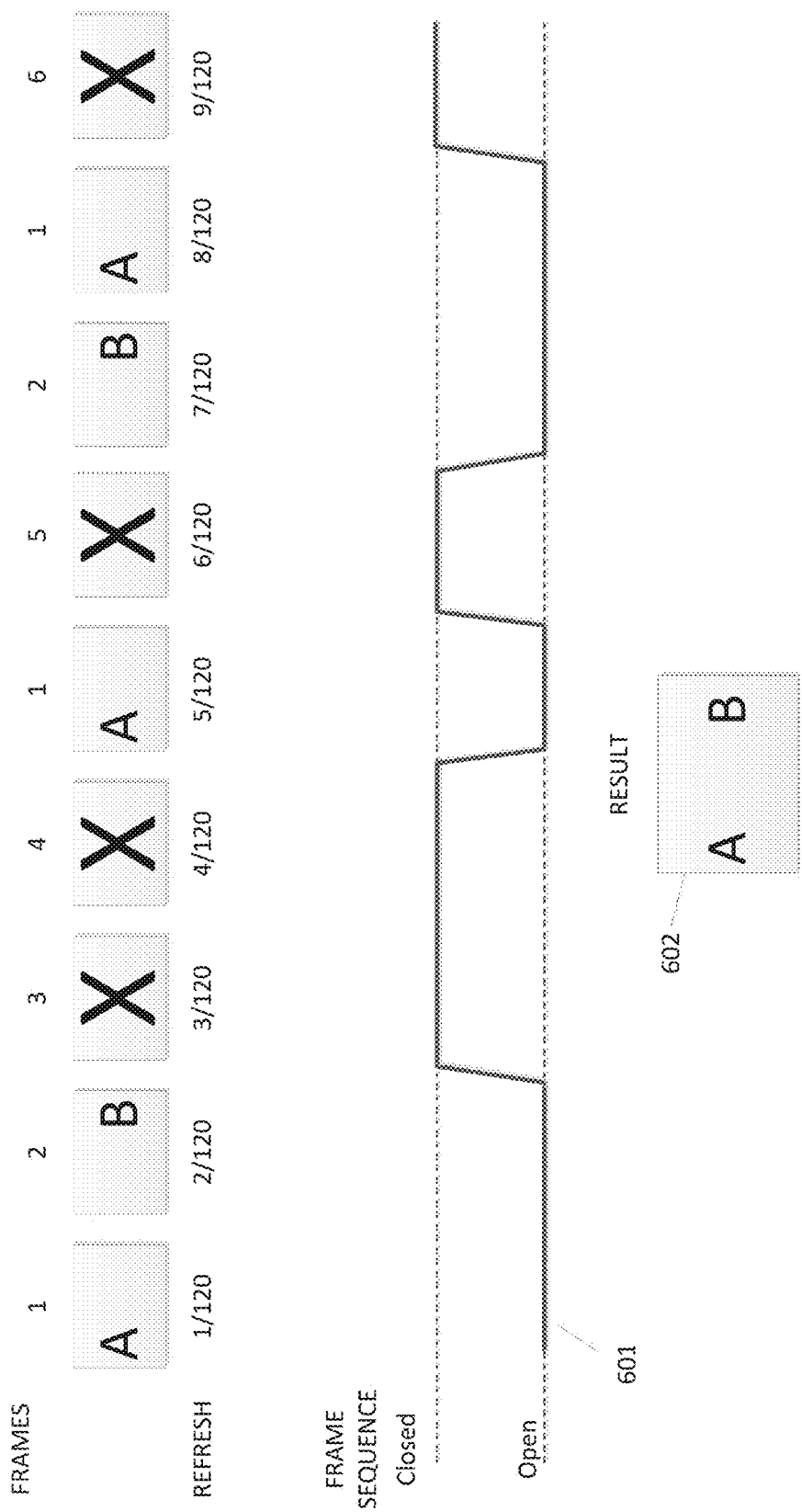

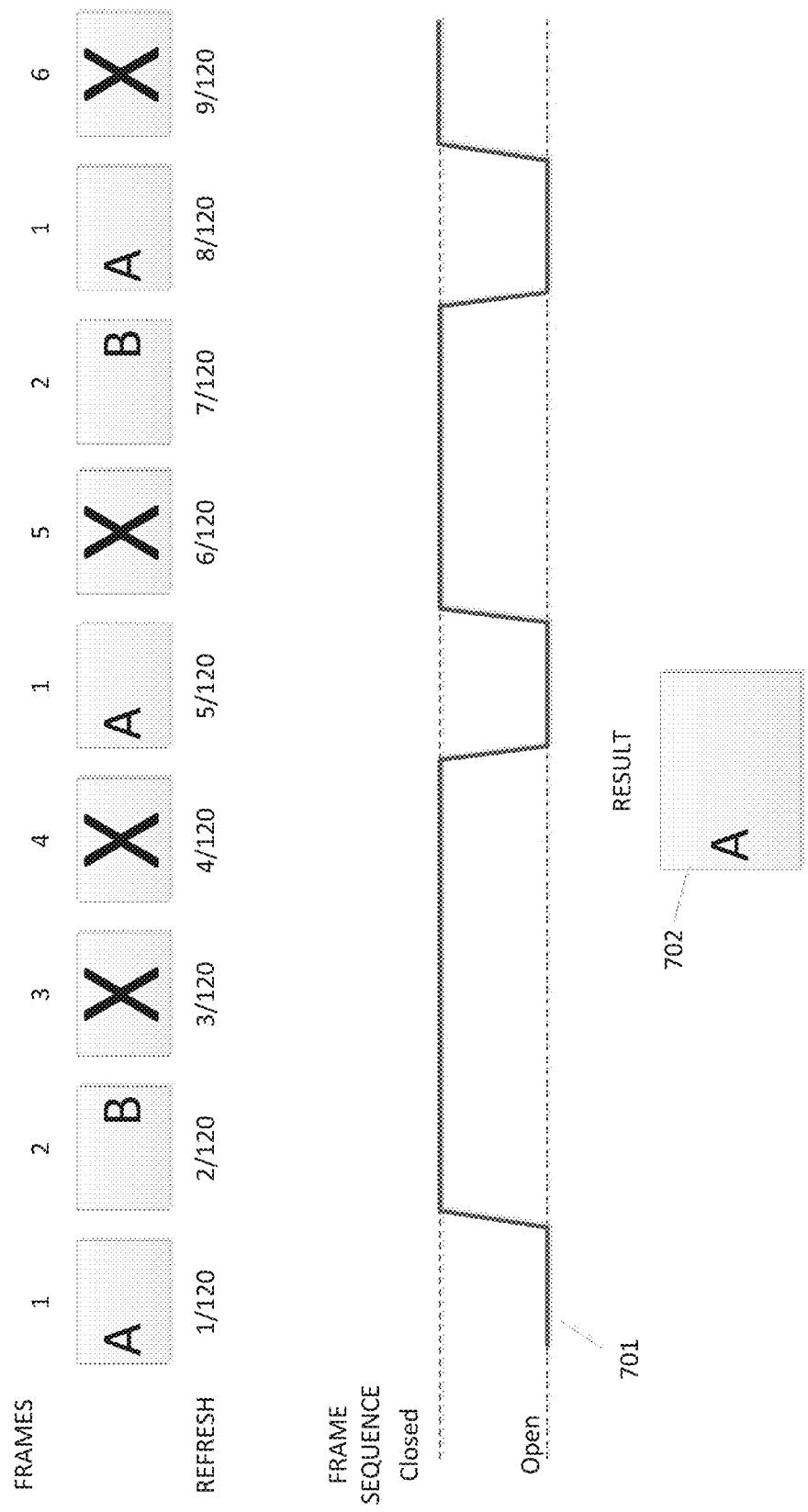

USE OF ACTIVE SHUTTER DEVICE TO SECURELY DISPLAY CONTENT

CROSS-REFERENCES TO RELATED APPLICATIONS

This application claims priority to European Patent Application No. 13154787.9, filed Feb. 11, 2013.

TECHNICAL FIELD

Embodiments of the subject matter described herein relate to the secure display of content to one or more users viewing a common display screen.

BACKGROUND

Display screens are becoming increasingly prevalent in daily life, and are commonly used to present information to groups of people, or to individuals, by using television/video screens, projectors, video advertising screens, and mobile devices such as mobile phones, tablets, laptops and so on.

There is an issue in that the information on these display screens is available to anyone in visual range. Information and content viewed on a display device cannot be guaranteed to be transmitted in a manner that allows only the intended audience to view it. Anyone able to see a screen can see the content, and when sensitive or confidential information is displayed on these screens, there is no way to control who can see this information without physically obscuring the line of sight to the display. This causes a potential security risk, whereby anyone can see content on a given screen, and also places a limitation on the information that an audience can see at any one time with a single video sequence on a display.

It is an aim of embodiments described herein to provide a way of allowing content on a display screen to be securely delivered to selected users.

SUMMARY OF THE INVENTION

Embodiments of the subject matter are defined in the independent claims, to which reference is now directed. Preferred features are set out in the dependent claims.

Embodiments of the subject matter provide a solution with an active shutter device, such as active shutter eye-wear, configured to synchronise with a display device such that only a coded sequence of frames can be viewed by the user. The secure content is encoded in a particular sequence, with obfuscating content in at least some of the other frames, such that only someone with active shutter eye-wear appropriately configured to allow the viewer to see the coded sequence of frames can see the secure content.

Active eye-wear can be used to synchronise with the display device such that only a coded sequence of frames is viewed by the wearer. The active eye-wear can blank in synchronisation with the display device in response to the display of each frame and can allow frames to selectively be viewed by the wearer in synchronisation with the content. The viewed content can be considered to be broken into two parts: the information to be securely transmitted, and obfuscating information. Each part is carried by separate sequences of frames displayed on the same display device at different times. Non-information carrying frames can be blanked out by the eye-wear, only allowing the information carrying frames to be shown to the wearer.

The information can be further distributed across a number of frames, each interspersed with non-information carrying frames. To ensure that the overall image, or sequence of images, cannot be seen by an observer, the non-information carrying frames carry an obfuscating pattern such as white noise, saturated colour or an additional moving image sequence. The end result is that only the person, or persons, viewing the intended frame sequence can view the secure content. The intended frame sequence can, optionally, itself be a securely generated sequence of frame numbers stored on the eye-wear or calculated in response to a pin code entry for example. The system could in such a way deliver a different secure message to different viewers simultaneously.

More specifically, embodiments of the subject matter may provide an active shutter device, such as active shutter eye-wear (101), for use in securely displaying content from a display (111) to a user (112). The secure content is encoded as a sequence of video frames interspersed within a set of video frames, at least some of the other frames within the set including obfuscating data. The device comprises a receiver (106) for receiving a synchronisation signal, at least one shutter mechanism (102, 103), and a processor (104). The processor, in response to the synchronisation signal, controls the shutter mechanism so as to synchronise the shutter mechanism with the display, particularly to synchronise the shutter mechanism with the refresh rate or the video frame display rate of the display. The processor is further configured to receive a frame sequence corresponding to the sequence of video frames used of the secure content, and to further control the shutter mechanism, in response to the received frame sequence, to allow only the video frames in the secure sequence to pass through the shutter.

The active shutter eye-wear may further comprise a memory coupled to the processor for storing the frame sequence, allowing the processor to access the frame sequence at a later time and enabling certain security features to be implemented. For example, the memory may be a read-only memory (ROM) such that the frame sequence cannot be altered. The memory may also be inaccessible to a hacker, such as by making it an on-chip memory.

The active shutter eye-wear may further comprise an input for receiving frame sequence data. This allows for the frame sequence to be updated, such that the eye-wear can be used to view different content, or content encoded according to different frame sequences, or to implement further security features. The frame sequence data may be the actual frame sequence identifying the sequence of video frames in which the secure content is encoded. Alternatively, the frame sequence data may be a seed value for generating the frame sequence, the eye-wear further comprising a frame sequence generating unit that generates a frame sequence based on a secret value stored on a memory of the eye-wear. As a further alternative, the input may be a keypad or input device, the frame sequence data being a code such as a PIN code; the processor may then be further configured to acquire the frame sequence using the PIN number by using the PIN code to decrypt an encrypted frame sequence stored on a memory, or by using the PIN code to calculate the frame sequence based on an algorithm stored on a memory.

Embodiments of the subject matter may further provide a method of encoding secure content in a sequence of video frames, for use in securely displaying content from a display to a user using active shutter eye-wear as described herein. The method comprises receiving (401) a first series of video frames containing the content to be securely displayed and receiving (402) a second series of video frames containing an obfuscating pattern. The first series of video frames are then interspersed with the second series of video frames according to a secure encoding sequence to form a third series of video frames, in which the frames of the first series are ordered relative to the frames of the second series according to the sequence. The frames of the second series of video frames are selected so as to obfuscate the content of the first series of video frames when the third series of video frames are viewed.

The obfuscating frames of the second series may contain white noise, saturated colour or a moving image sequence. The secure content may comprise visual data formed as a composite image by multiple frames from the first series of video frames.

Optionally, the secure content may comprise first and second visual data, the first visual data being formed by one or more images contained in a first set of frames from the first series of video frames and the second visual data being formed by one or more images contained in a second set of frames from the first series of video frames, the second set being different to the first set. The active eyewear may then be controlled to allow the first set of frames to pass through, or the second set of frames to pass through, or both, so as to allow the user to view an image, or series of images containing the first visual data, the second visual data or both. The first set may be completely different to the second set, or there may be overlapping frames between the two.

The secure content is preferably encoded in a secret predetermined sequence of video frames. The frame sequence may be comprised of a non-periodic sequence of frames. The non-periodic sequence of frames preferably does not repeat. By making the sequence of frames non-periodic and non-repeating it makes it more difficult for a hacker to guess the correct sequence of frames and view secured content.

Embodiments of the subject matter may further provide a system comprising a display, displaying thereon secure content encoded according to the method described herein, and first and second active shutter eye-wear as described herein. The frame sequence received by the processor of the first eye-wear can be different to the frame sequence received by the processor of the second eye-wear such that the shutter mechanism of the first eye-wear allows through the shutter a different sequence of frames to the second eye-wear. This allows different users to view different content securely. More than two sets of active shutter eye-wear may be used with a given display, allowing multiple users to view the same or different secure content.

BRIEF DESCRIPTION OF THE FIGURES

Embodiments of the subject matter will now be described with reference to the accompanying figures in which:

FIG. 5 is a schematic diagram of the components of an alternative embodiment of the invention;

FIG. 6 is a diagram of a further set of example frames showing how a frame sequence controls the shutter of the eye-wear to generate an image of secure data; and FIG. 7 is a diagram of the example frames of FIG. 6 showing how a different frame sequence can control the shutter of the eye-wear to generate a different image of secure data.

DETAILED DESCRIPTION OF PREFERRED EMBODIMENTS

Figure 1:
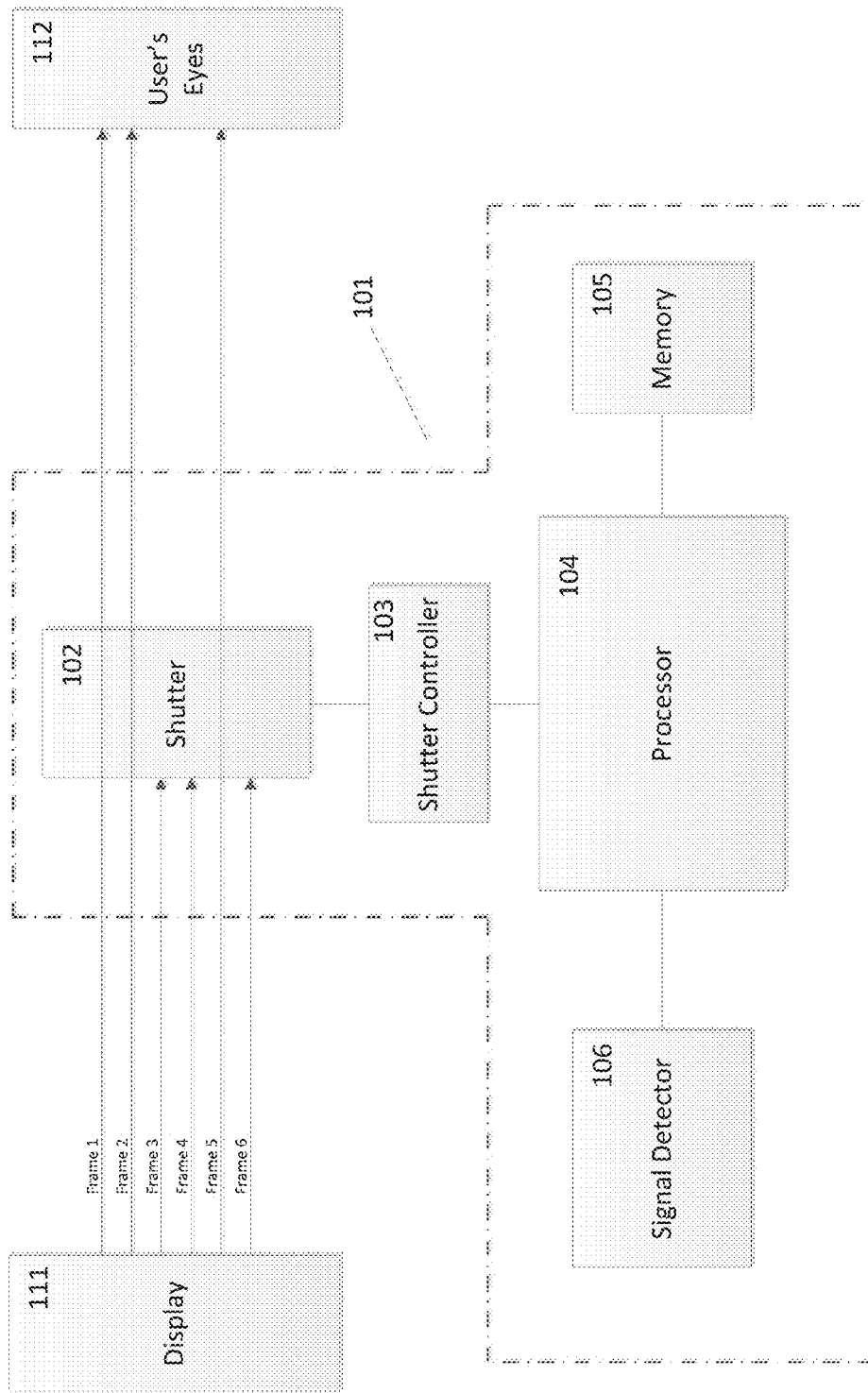
FIG. 1 is a schematic diagram of the components of an embodiment of the invention.

FIG. 1 shows a schematic view of the components of active shutter eye-wear 101 according to a first embodiment. The eye-wear 101 comprises at least one shutter 102, a shutter controller 103, a processor 104, a memory 105 and a signal detector 106.

The shutter 102 is positioned between display 111 and at least one eye of user 112. The display 111 operates in a known manner by sequentially displaying frames of content which are displayed at a frame rate sufficient to be seen by the viewer as a moving image. Example frame rates are 24 or 25 fps. These frames may be displayed on screens that have a particular refresh rate, for example the refresh rate may be 60 Hz, 100 Hz, 120 Hz or 240 Hz. The shutter can be controlled between a first state, in which light can pass through it, and a second state in which light cannot pass through it. These may be considered open and closed states respectively.

There are many different technical solutions for mechanisms to provide a shutter with the appropriate functionality, any of which may be used with embodiments of the subject matter described herein as appropriate. The shutter may not be a mechanical shutter, but may instead use electrical, chemical, or electrochemical properties of materials to transition between open and closed states. One example of a suitable shutter would be liquid crystal shutters, of the sort used in liquid crystal display (LCD) glasses commonly used in active 3D eye-wear for viewing content from displays in 3D. Two shutters may be provided, one for each eye, although a single shutter covering one or both eyes is also possible. Where two shutters are provided they preferably transition between open and closed states substantially simultaneously so that both eyes of the user receive the same frames of video.

The shutter 102 is controlled by shutter controller circuitry 103, which is coupled to a processor, or central control unit, 104 and controls the shutter 102 between open and closed states in response to control signals from the processor 104. Again, appropriate shutter controller and shutter combinations may include the type of shutter controllers used in active 3D glasses. Where two shutters are provided, two shutter controllers may be used, or a single controller can be used for both shutters, since the shutters preferably change between open and closed states in a synchronised manner, substantially at the same time.

The processor 104 is further coupled to a signal detector, sensor, or receiver 106. The signal detector receives a synchronisation signal which is used by the processor to synchronise the refresh rate, or the frame rate, of the display 111 with the shutter 102. This synchronisation is required such that the shutter 102 can block or allow through specific frames from the display 111 and is a feature used in active 3D glasses. The synchronisation signal may be received from any appropriate source. Typically, this will be either from the screen itself, for example using a blanking interval, or from an emitter coupled to the display device, but any appropriate method for synchronising the eye-wear to the display may be used. The processor 105 is also coupled to a memory or store 105, which may be a re-writable memory, a read only memory, or in some embodiments, a random-access memory (RAM).

Also shown in FIG. 1 is a series of frames 1 to 6 which are presented sequentially by display 111 and will be used to give an example of how embodiments of the subject matter may function. Frames 1, 2 and 5 contain information to be securely transmitted to the user. Frames 3, 4 and 6 contain obfuscating content. When frames 1 to 6 are shown in sequence at the frame rate of the display the obfuscating content of frames 3, 4 and 6 makes the secure content imperceptible to a viewer. The obfuscating data may be in the form of white noise, saturated colour or a sequence of moving images such as a film or decoded television signal for example. The secure content is, therefore, encoded according to a particular frame sequence within the overall set of frames output by display 111, which includes frames of obfuscating content.

The shutter 102, under the control of the shutter controller 103 and processor 104, is synchronised to the refresh rate or to the frame rate of the display 111 using the signal received at signal detector 106. The processor 104 also receives a frame sequence, which may be stored on memory 105. The frame sequence corresponds to the frame sequence used to encode secure content in the display output 111, and is used by the processor to open and close the shutter 102 in a manner corresponding to the frame sequence. Since the shutter is also synchronised to the frame rate or refresh rate of the display, the shutter is sequentially opened to allow through the frames of secure content and closed to filter out the obfuscating frames. In this example, the received frame sequence ensures that the shutter is open for frames 1, 2 and 5 and closed for frames 3, 4 and 6. In this manner, the method can be considered as a form of time division multiple access (TDMA).

Figure 2:
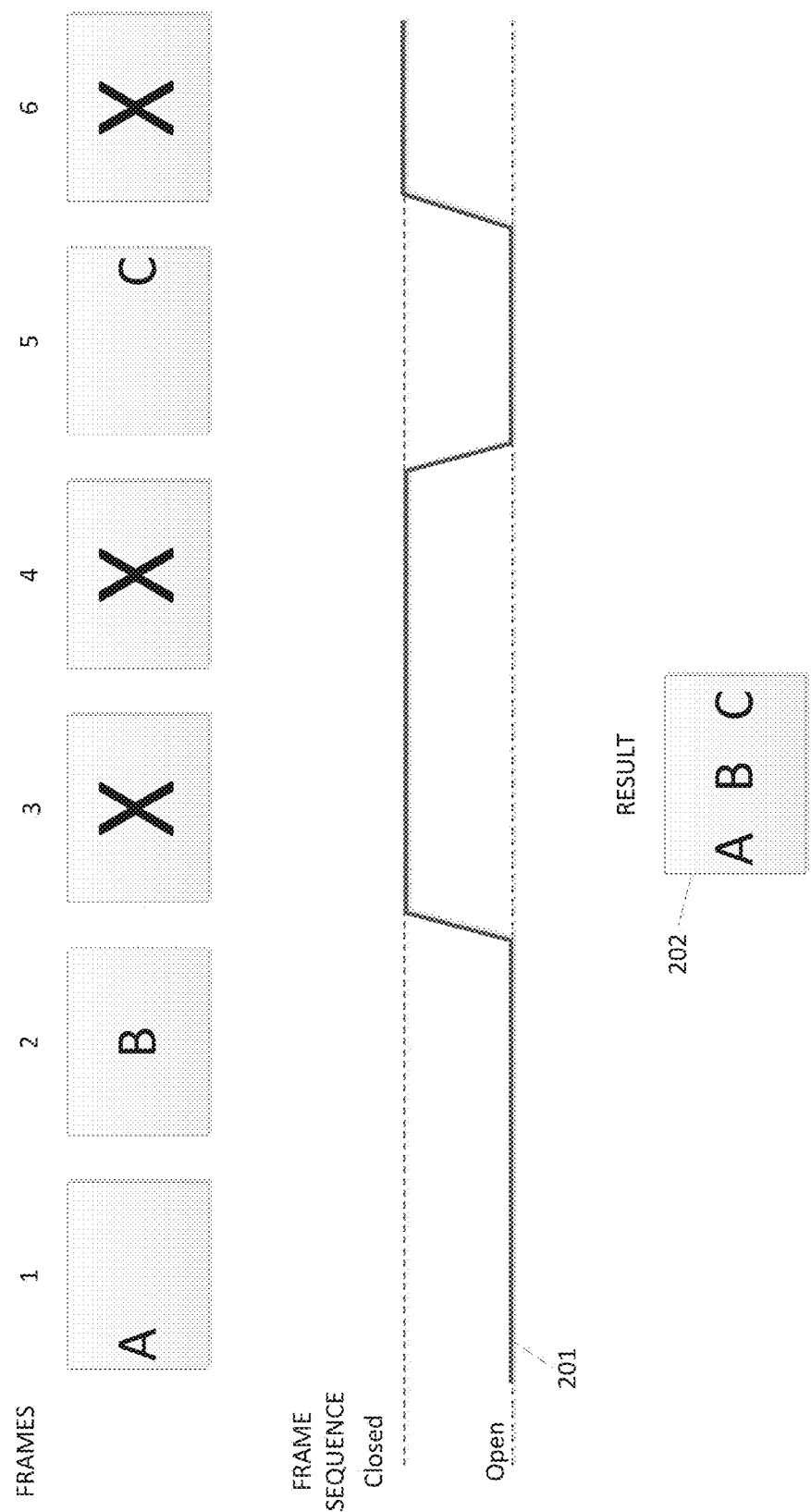
FIG. 2 is a diagram of example frames showing how a frame sequence controls the shutter of the eye-wear to generate an image of secure data.

FIG. 2 shows the example frame sequence of FIG. 1 in further detail. Frames 1 to 6 are shown sequentially from left to right at the top of the figure, with example content for each frame indicated. The obfuscating data of frames 3, 4 and 6 are marked as "X", although the obfuscating content may vary from frame to frame. The timings for when the shutter 102 is open or closed are indicated by line 201. The resulting image 202 seen by the user of the active eye-wear is also shown. As can be seen, the resulting image is a combination of the three frames containing secure content 1, 2 and 5. This example makes use of the persistence of vision of the human eye whereby images will persist in the user's vision such that if frames are shown together in quick enough succession, they will appear as a single image.

The example of FIG. 2 is demonstrative only. In practice, the frame sequence 1 to 6 may need to be repeated, perhaps multiple times, within a particular period of time to produce a persistent image that the user can discern. For reasons that will be elaborated on below, it is preferable not to repeat a particular given frame sequence, so a different sequence using the same content, at least for frames 1, 2 and 5, may be used for each repeat of these frames. A repeated sequence may, for example, involve showing the frames in the order |X|A|X|B|C|X|, this being a different sequence to that shown in FIG. 1 and FIG. 2.

Figure 3:
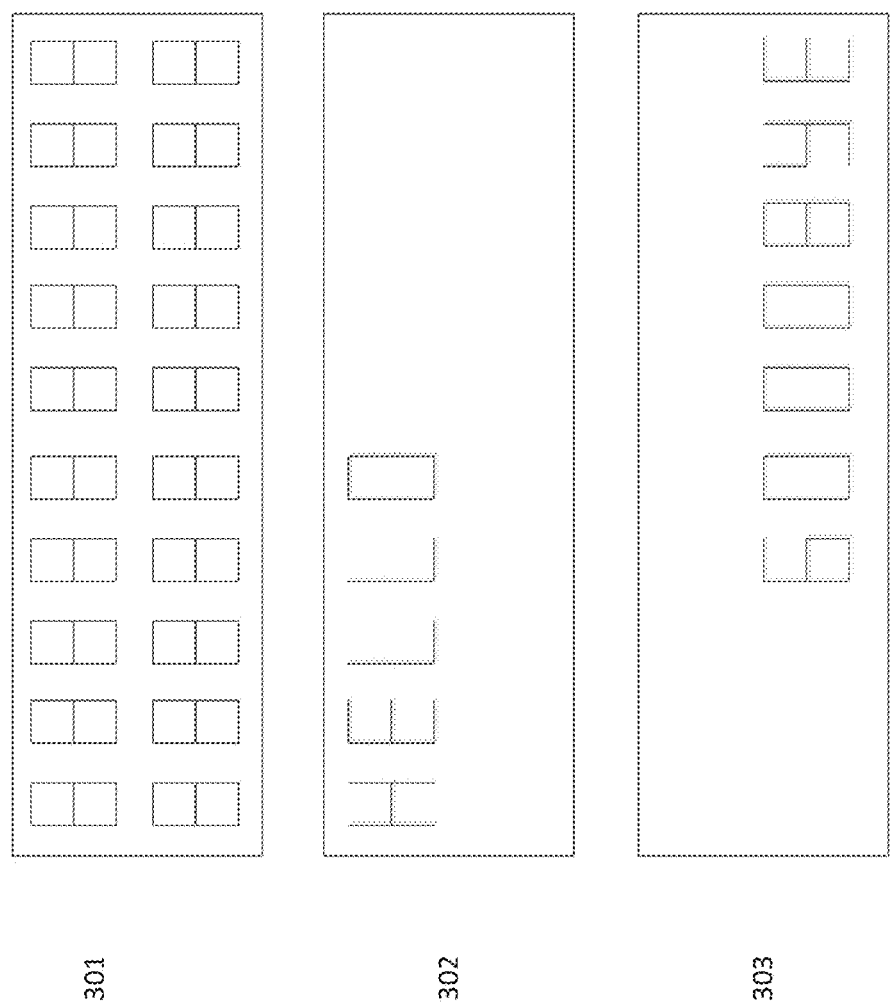
FIG. 3 is an example of an image generated with obfuscating frames and two resulting images obtainable with eye-wear using different frame sequences.

FIG. 3 shows a further example of how embodiments of the subject matter may be used. The obfuscating data may be in the form of a series of frames making a grid 301 formed of a series of characters or lines. A viewer seeing a display presenting a set of frames including the obfuscating data would see an image such as image 301 in FIG. 3, from which no useful information can be discerned. Each of the lines making up the characters, or each of the characters themselves, may be formed from different frames. Each set of frames relating to a particular line or character can be considered a set of frames that a user must see in order to discern data that includes that particular line or character. Alternatively, groups of lines or characters may be formed from different frames, each set of frames relating to a particular group being a set of frames. The active eye-wear can then be used to pick out particular frames, or sets of frames, which are combined into a single image generated when these frames are seen by a user, taking into account the persistence of the user's vision. Images 302 and 303 show two different example images that can be generated by using appropriate frame sequences, the images containing securely transmitted information that is not viewable by a user without appropriately configured active eye-wear containing, or associated with, the appropriate frame sequence required to uncover that data.

Such embodiments of the subject matter can be used to securely associate a given set of active eye-wear with a given user such that a user can pick out a message intended solely for them. This aspect can be combined with a device for detecting or indicating the proximity of a user to a screen such that the screen only displays the appropriate secure frame sequence when the user is nearby. The device communicates with a controller coupled to the screen, allowing the screen controller to determine that the device is proximate to the screen, and as a result the screen is controlled to display a particular set of frames, some of the frames containing data to be securely transmitted to the user according to a particular secure sequence. Advertising video boards, for example, may be provided which, upon detecting the presence of a user, encode an appropriate secure sequence of frames in the output of the advertising display to provide a personal message to the user.

The device for use in detecting or indicating the proximity of the user may be a device equipped with Bluetooth, a global navigation satellite system (GNSS) such as global position system (GPS), or a radio-frequency identification (RFID) equipped device for example. The device may be a user's mobile phone, for example, or it may be a dedicated device worn or carried by the user. When the device is in communication range of the screen controller, or the device detects that it is in the proximity of a screen, it may send a communication to the screen controller to indicate this. Alternatively, the screen controller may detect the presence of the mobile phone, for example by using an RFID tag. The detection of the proximity to the screen may therefore be active, requiring a communication from the device to the screen controller, or it may be passive, whereby the screen controller detects the device when it is in detection range. As a further alternative, the active eye-wear may itself be equipped with the means for detecting location or indicating proximity to a screen; the active eye-wear may be further equipped with output means for alerting the user to the content being displayed on the screen, such as a speaker for providing an audio warning, or vibrating means for providing a physical vibration.

Although the examples of FIGS. 2 and 3 show static images being displayed to the user, it will be appreciated that it is also possible to expand the method to generate a moving video image for a user to view by encoding in the frame sequence a series of frames that make up such moving images.

Figure 4:
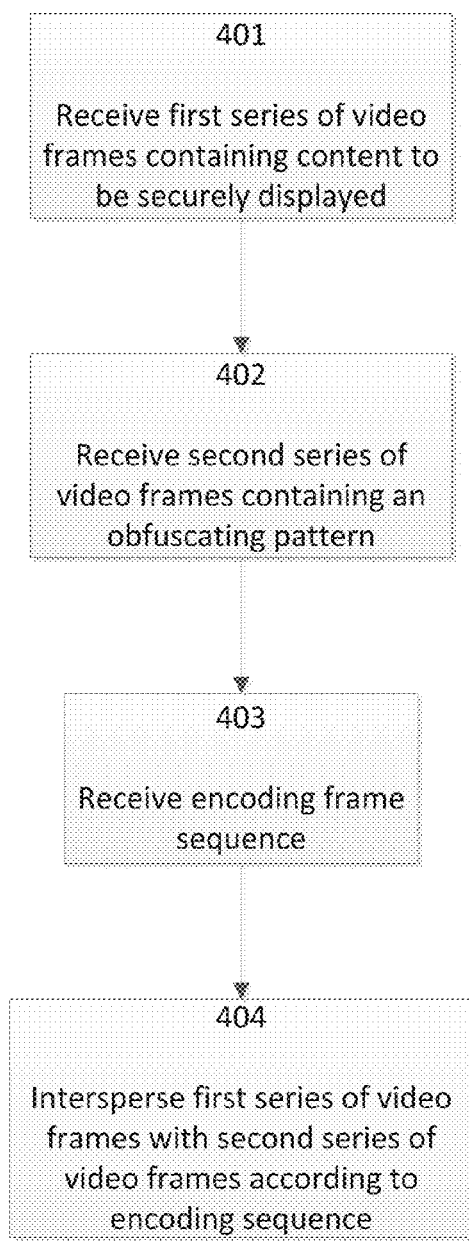
FIG. 4 is an example method of producing a set of video frames for display according to an embodiment of the invention.

FIG. 4 shows an example of a method of producing a video display output for use with the active eye-wear described herein. At step 401, a first series of video frames are received containing the secure information to be transmitted to the user. At step 402, a second series of video frames is received containing the obfuscating video frames. The obfuscating frames may make up a moving picture video, or they may be non-coherent data. In either case, the purpose of the obfuscating frames is to obscure or conceal the content of the first series of frames when the first and second sets of frames are seen together in interleaved sequence. It may be sufficient for the obfuscating frames to simply contain non-secure content, or information that is different to that provided in the first series of video frames. At step 403 a frame sequence is received that indicates the sequence in which the frames of the first series of video frames are to be combined with the frames of the second series of video frames into a third series of video frames. At step 404, the first set of frames is interspersed with the second set according to the received frame encoding sequence. This frame encoding sequence is preferably a secure and secret code sequence. The resulting set of frames can be displayed by a display and the first set of frames can only be extracted using active eye-wear associated with the appropriate encoding sequence. The resulting set of frames may be converted into a format for broadcast over the air, via satellite, over the internet, via cable or any other suitable distribution method. The set of frames may be converted into a format for any other type of distribution to one or more devices for display on a screen to a user.

Steps 401, 402 and 403 may be performed in any order. Some or all of these steps may be performed simultaneously. The steps may be performed locally, at the display screen, or prior to broadcast of a signal containing the third set of frames.

The secure content may be encoded in a predetermined code sequence indicative of a sequence of video frames containing frames with secure information and frames with obfuscating information. The frame code sequence may simply be a binary sequence indicating which frame numbers in a set of frames are to be used for secure content and which frame numbers are to be used for obfuscating content. A secure predetermined code sequence is generated and this code sequence is then used to intersperse or interleave the frames of secure content with the obfuscating frames. The processor of the active eye-wear then receives data indicative of the predetermined code sequence and uses the code sequence to control the shutters and separate the secure content from the obfuscating content. The predetermined code sequence may be stored in the memory 105 of the active eye-wear and may be provided to the processor 104 when the eye-wear is being used to discern securely transmitted content.

Preferably, the frame code sequence used to encode the secure frames is non-periodic, in the sense that it is not formed of a periodic or repeating pattern. The pattern may be randomly generated using, for example, a random number generator to provide a seed value from which a random sequence of secure frames and obfuscating frames can be generated. The frame sequence is then securely transmitted, or otherwise provided, to the active eye-wear. This makes it difficult for a hacker to simply guess the right sequence of opening and closing the shutters of the eye-wear in order to extract the frames carrying the secure information.

In the embodiment of FIG. 1, the active eye-wear includes a memory 105 which can be used to store the secure predetermined code sequence. If the memory is not externally accessible, or it is a read only memory, then the active eye-wear can be considered to be associated with a particular code permanently. In this way, eye-wear can be personalised to a particular individual. Alternatively, the eye-wear may be configured to work with different code sequences, by securely storing a plurality of code sequences in memory that may be selected, and/or by being securely updatable.

FIG. 5 shows an alternative embodiment of the active eye-wear 101, the like components of FIG. 1 being given like reference numbers. In addition, to the components of FIG. 1, the active eye-wear of FIG. 5 includes an input 507. The input 507 may be used for receiving updated frame sequence code data, or for receiving security information to access codes already stored in the memory 105.

The frame sequence data may be the frame sequence itself which, when received at input 507, may be stored by the processor in the memory 105 for later access. The frame sequence may be provided to the input 507, by wireless transmission or by physical connection, preferably in encrypted form so that the sequence is kept secure and is not made available to third parties. The active eye-wear may then further comprise a cryptographic unit for decrypting the frame sequence either prior to storage in the memory 105, or prior to use by the processor 104, if required. The cryptographic unit is preferably a functional unit that may be enacted in hardware or in software executing on the processor 104. The decryption may be based on a separate secret stored in the memory 105, or received via input 507.

Rather than receiving the actual frame sequence, the active eye-wear may receive a seed value from which the frame sequence can be generated internally in the eye-wear. The frame sequence may be generated by a frame sequence generating unit which may be a dedicated hardware unit or may be enacted by software executing on the processor 104. Based on the seed value, a frame sequence may be generated using a secret value stored on a memory in the eye-wear. The seed value may be used in combination with the same secret value to generate the correct frame sequence on the display or transmission side.

The seed value may be derived by using a separate seed generating device which, in response to the user inputting a secret code or pin number, generates a seed value. The seed value may then be input into the eye-wear via input 507. This may be achieved by manually entering the seed value on a keypad located on, or associated with, the eye-wear 101, or it may be automatically transmitted to the eye-wear via a wired or wireless transmission, which may also be encrypted if required. The seed generating device includes a secret key or algorithm for generating a valid seed value from a particular user input, and may be embodied in software executing on a computer, laptop, tablet or other portable device such as a user's mobile phone. Alternatively, the seed generating device may be in the form of a dedicated encrypted device.

As a further alternative, the eye-wear may, as an input 507, include a keypad attached to or coupled with it. The user may input a secret PIN into the keypad to generate the correct code sequence, or to unlock the user's specified code sequence from memory.

However it is achieved, a code sequence may be securely generated and securely transmitted to, stored in, or generated by the active eye-wear such that the code is not revealed to third parties and is never publicly available or "in the clear". In particular, the secure frame sequence may be provided to the eye-wear in encrypted or encoded form to be decrypted or decoded using processing means on the eye-wear or associated therewith. Each code sequence may be personal to a given user.

The term "frame rate" has been used to describe the rate at which frames of content are displayed, or replaced with new frames. The frame sequence may be used to refer to a sequence of frames that identify the frames of secure content relative to the frames of the obfuscating content as the frames are presented by the display, so that the secure content can be extracted. The term "refresh rate" is related to the frame rate, but refers to the number of times a display redraws the picture in a second. Each frame may be redrawn a number of times, thus occupying a number of screen refreshes. Thus one "frame", as referred to in relation to the "frame rate", may occupy more than one screen refresh, such as two or three screen refreshes.

For the avoidance of doubt, the active eye-wear may synchronise with the frame rate of the display, but it may also, or instead, synchronise with the refresh rate of the display to allow more precise control of the specific frames that are allowed through to the user's eyes. The frame sequence may then refer to the sequence of frames presented in relation to the refresh rate of the display screen in question. Each refresh of the screen displays a particular frame of content, and that frame of content may be displayed more than once in different screen refreshes. The frame sequence may, therefore, be more than just a sequence or ordering of different individual frames, and may be a sequence indicating which frames are displayed for a given screen refresh or which screen refreshes should display secure frames and which should display obfuscating frames. The frame sequence may therefore give the frame positions in relation to the refresh rate of the screen, the frames potentially being repeated one or more times as the screen is refreshed. The frames may be interleaved with each other over different screen refreshes to provide the desired secure content to the user, as demonstrated in FIG. 6, which further shows how the shutter of the eye-wear may activate on refresh of the screen.

FIG. 6 shows a first set of frames corresponding to content "A", and a second set of frames, which are different to the first set of frames, corresponding to content "B". These first and second sets of frames correspond to data to be transmitted securely to the user. Obfuscating frames are again shown by the letter "X". FIG. 6 shows the content of each frame, identifying the frame number above that content, and an example of the timing by which these frames may be presented by the display according to the particular refresh rate.

In this example, the refresh rate of the screen is 120 Hz and so it is capable of redrawing a given frame 120 times per second. Each refresh corresponds to a given frame of content inserted into the stream, which when combined with the persistence of vision of the user, allows an image or series of images to be built up. The active eye-wear filters out specific refreshes of the screen as shown by line 601 so as to filter out the obfuscating content and allow the screen refreshes containing the frames of secure content to pass through to the user's eyes. This builds up the resulting image 602 for the user to view, the image being rendered obscured by the obfuscating frames when appropriately configured eye-wear is not used.

As can be seen in FIG. 6 the sequence of frames is non-linear in the sense that frames of secure content do not appear at regular intervals. The sequence of frames has been securely generated such that it cannot be easily guessed, whereby the correct frame sequence, or sequence of refreshes, to be filtered by the shutter cannot be easily provided to a processor of active eye-wear to allow the content to be revealed. The sequence of frames has also been securely passed to the eye-wear according to one of the methods described above.

FIG. 7 highlights an example of providing different secure data to different users depending upon the frame sequence associated with a given set of eye-wear. The same sequence of frames, occupying the same screen refreshes, of the example in FIG. 6 is used. It will be appreciated that in the example of FIG. 7 there are two sets of frames, the content of each set being different. The first set corresponds to frame 1, and includes content "A". The first set is inserted in the first, fifth and eighth refreshes. The second set corresponds to frame 2, and includes content "B". The second set is inserted in the second and seventh refreshes.

It is possible to select whether the user sees content "A", content "B", or both, by controlling the frame sequence associated with their active eye-wear. In this manner, the amount of secure content viewable by the user can be controlled. In the example of FIG. 6 the active eye-wear allows through both sets of content, allowing the user to see both content "A" and "B". In the example of FIG. 7, only those frames corresponding to the first set are allowed through by the active eye-wear, resulting in the user only seeing content "A".

A plurality of sets of frames may be provided, each set containing different content. By allowing one or more sets of frames corresponding to the different content data through the eye-wear, control is provided over which content can be seen by a given user.

Each set of frames may contain repeated frames so as to build up an image that can be seen by a user. This may include a textual message or picture for the user, for example. Alternatively the set may include a plurality of different frames that make up a moving image, although it may still be preferable to repeat frames over more than one screen refresh to obtain a smoother image.

Embodiments of the subject matter have been described in relation to displays for displaying sequences of frames. The display may be any appropriate type of display device including projectors, plasma TV's, light-emitting diode (LED) TV's, LCD displays, organic light-emitting diode (OLED) displays and so on.

Embodiments of the subject matter have been described in relation to active shutter eye-wear. The term "eye-wear" may incorporate any appropriate device that is supported or rests on the user such that the active shutter viewing material is positioned between the display and the user's eye. Eye-wear may therefore include glasses, monocles, visors and so on. It is also possible to use any sort of active shutter viewing material, or active transmissive viewing medium, that can blank in synchronisation with the display device in response to the display of each frame or screen refresh and can allow frames to selectively be viewed by the user in synchronisation with the content. The viewing medium does not need to be contained within "eye-wear" as such, and any embodiments of the subject matter could, more generally, be considered to use an active shutter device comprising an active shutter viewing material. For example, a pane of viewing medium, preferably supported by a frame, could be used that the user holds or positions between their eyes and the display. An arrangement having a frame for supporting the active shutter material, and optionally a handle attached to the frame, could therefore be used for those that do not wish to use eye-wear. Such an arrangement may be implemented in a device that looks like a magnifying glass, for example. Any of the features described in relation to the eye-wear could be applied more generally to active shutter devices that provide different arrangements for supporting active shutter material.

What is claimed is:
1. A system comprising:
an active shutter eye-wear device for use in securely displaying secure content from a display to a user, the secure content being encoded as a sequence of video frames interspersed within a set of video frames, the active shutter eye-wear device comprising:
a receiver for receiving a synchronisation signal;
at least one shutter mechanism;
an output means; and
a processor configured to:
control the shutter mechanism in response to the synchronisation signal so as to synchronize the shutter mechanism with the display;
receive a frame sequence corresponding to the sequence of video frames; and further control the shutter mechanism, in response to the received frame sequence, to allow only the video frames in the sequence to pass through the shutter mechanism; and a device to detect proximity of the active shutter eye-wear device to the display and send a communication indicating the proximity of the active shutter eye-wear device to a controller coupled to the display, the display being controlled by the controller to display the frame sequence when the user is nearby as a result of the communication, the output means alerting the user to the secure content being displayed on the display.

2. The system according to claim 1, wherein the active shutter eye-wear device further comprises an input for receiving frame sequence data.

3. The system according to claim 2, wherein the frame sequence data is the frame sequence identifying the sequence of video frames in which the secure content is encoded.

4. The system according to claim 2 wherein the frame sequence data is a seed value for generating the frame sequence, the active shutter eye-wear device further comprising a frame sequence generating unit that generates the frame sequence based on a secret value stored on a memory of the active shutter eye-wear device.

5. The system according to claim 2 wherein the input is a keypad, the frame sequence data being a PIN code, and wherein the processor is further configured to acquire the frame sequence using the PIN code by:
using the PIN code to decrypt an encrypted frame sequence stored on a memory; or by
using the PIN code to calculate the frame sequence based on an algorithm stored on the memory.

6. The system according to claim 2 further comprising a cryptographic unit for decrypting encrypted frame sequence data.

7. The system according to claim 6, wherein the frame sequence data is the frame sequence identifying the sequence of video frames in which the secure content is encoded.

8. The system according to claim 6, wherein the frame sequence data is a seed value for generating the frame sequence, the active shutter eye-wear device further comprising a frame sequence generating unit that generates the frame sequence based on a secret value stored on a memory of the active shutter eye-wear device.

9. A system according to claim 1 wherein the device sends the communication to the controller when it is in communication range or when it detects that it is in the proximity of the display.

10. A system according to claim 1 wherein the device for detecting or indicating the proximity to the display uses one of Bluetooth, a global navigation satellite system or radio-frequency identification (RFID).

11. A system according to claim 1 wherein the active shutter eye-wear device comprises the device.

12. A system according to claim 1, wherein the output means comprises a speaker providing an audio warning alerting the user to the content being displayed on the display.

13. A system according to claim 1, wherein the output means further comprises a vibrating means providing a physical vibration alerting the user to the content being displayed on the display.

14. A method of encoding secure content in a sequence of video frames, for use in securely displaying content from a display to a user using an active shutter eye-wear device, the method comprising:
determining whether the active shutter eye-wear device is proximate to the display based on a communication sent by a device detecting the proximity of the active shutter eye-wear device to the display; and
when the communication indicates the active shutter eye-wear device is proximate to the display:
controlling the display to output a frame sequence corresponding to the sequence of video frames when the user is nearby by interspersing a first series of video frames containing the content to be securely displayed with a second series of video frames containing an obfuscating pattern according to an encoding sequence to form a third series of video frames, in which the frames of the first series are ordered relative to the frames of the second series according to the sequence, wherein the frames of the second series of video frames are selected so as to obfuscate the content of the first series of video frames when the third series of video frames are viewed; and
alerting, by output means of the active shutter eye-wear device, the user to the secure content being displayed on the display.

15. A method according to claim 14, wherein the content comprises first and second visual data, wherein:
the first visual data is formed by one or more images contained in a first set of frames from the first series of video frames;
the second visual data is formed by one or more images contained in a second set of frames from the first series of video frames, the second set being different to the first set; and
the active shutter eye-wear device is controlled to allow the first set of frames to pass through, or the second set of frames to pass through, or both, so as to allow the user to view an image, or series of images containing the first visual data, the second visual data or both.

16. A system comprising:
a display for use with an active shutter eye-wear device for use in securely displaying secure content from the display to a user, the secure content being encoded as a sequence of video frames interspersed within a set of video frames;
a device to detect proximity of the active shutter eye-wear device to the display and send a communication indicating the proximity of the active shutter eye-wear device;
a transmitter for transmitting a synchronisation signal to control the shutter mechanism of the active shutter eye-wear device so as to synchronize the shutter mechanism with the display;
a processor configured to:
determine whether the active shutter eye-wear device is proximate to the display based on the communication; and
when the communication indicates the active shutter eye-wear device is proximate to the display, control the display to output a frame sequence corresponding to the sequence of video frames when the user is nearby by interspersing a first series of video frames with a second series of video frames according to an encoding sequence to form a third series of video frames in which the frames of the first series are ordered relative to the frames of the second series according to the sequence, wherein:
the first series of video frames contain the content to be securely displayed;
the second series of video frames contain an obfuscating pattern; and the frames of the second series of video frames are selected so as to obfuscate the content of the first series of video frames when the third series of video frames are viewed; and output means of the active shutter eye-ear device alerting the user to the secure content being displayed on the display.

17. A system according to claim 16, wherein the output means comprises a speaker of the active shutter eye-wear device providing an audio warning alerting the user to the secure content being displayed on the display.

18. A system according to claim 16, wherein the output means comprises a vibrating means of the active shutter eye-wear device providing a physical vibration alerting the user to the secure content being displayed on the display.

19. A system comprising:
an active shutter eye-wear device for use in securely displaying secure content from a display to a user, the secure content being encoded as a sequence of video frames interspersed within a set of video frames, the active shutter eye-wear device comprising:
a receiver for receiving a synchronisation signal;
at least one shutter mechanism;
output means for alerting the user; and
a processor configured to:
control the shutter mechanism in response to the synchronisation signal so as to synchronize the shutter mechanism with the display;
receive a frame sequence corresponding to the sequence of video frames; and
further control the shutter mechanism, in response to the received frame sequence, to allow only the video frames in the sequence to pass through the shutter mechanism; and
a device for detecting or indicating the proximity of the active shutter eye-wear device to the display and communicating with a controller coupled to the display, the display being controlled to display the frame sequence when the user is nearby as a result of the controller determining the active shutter eye-wear device is proximate to the display;
wherein the output means of the active shutter eye-wear device alerts the user when the secure content is being displayed on the display.

20. The system of claim 19, wherein:
the display comprises an advertising display; and
the secure content comprises a personal message intended only for the user.

* * * * *